Sept. 27, 1938.   A. B. BEAR   2,131,579
FRICTION CLUTCH MECHANISM
Filed Jan. 20, 1936   4 Sheets-Sheet 4

INVENTOR
ALBERT B. BEAR
By his Attorneys

Patented Sept. 27, 1938

2,131,579

UNITED STATES PATENT OFFICE 2,131,579

FRICTION CLUTCH MECHANISM

Albert Barnes Bear, St. Paul, Minn., assignor of eight and one-sixth percent to Seth Henry, eight and one-sixth percent to Theodore Nikas, eight and one-sixth percent to James Pontikis, eight and one-sixth percent to Howard H. McGill, eight and one-sixth percent to Christ D. Pamel, eight and one-sixth percent to Nick Chiomes, and ten percent to John Goff Application January 20, 1936, Serial No. 59,960

7 Claims. (Cl. 192—68)

This invention relates to an improved friction clutch mechanism, which, while primarily developed for use as a speed change control device for continuously variable speed transmission mechanisms of the type disclosed in my co-pending application, S. N. 59,959, filed of even date herewith, is, nevertheless, adapted for very general use as a variable degree coupling device and is herein illustrated and described in conjunction with conventional driving connections of an automobile.

Among the important objects of the invention is the provision of a clutch mechanism of the general type disclosed wherein the clutch throwout collar or bearing is subject to less pressure under clutch-releasing action than is the case in conventional clutch mechanisms of similar character and having an equal application pressure. Another important object of the invention is the provision of a yielding pressure set clutch mechanism which can be released with a minimum of pressure through very simple and short linkage, and a still further object of the invention is the provision in a clutch mechanism of the friction type wherein the co-operating friction elements are set by means of suitable compression spring or springs, of means for multiplying the clutch-setting pressure of the spring or springs on the co-operating friction elements without increasing the pressure necessary to overcome the clutch-setting spring or springs to slip or release the clutch.

Still another object of the invention is the provision of a simple and efficient means for automatically ventilating the friction elements of a friction clutch to thereby keep the friction elements cooled below damaging temperatures under severe use.

In the accompanying drawings, which illustrate the invention, like characters indicate like parts throughout the several views.

Referring to the drawings.

Figure 1:
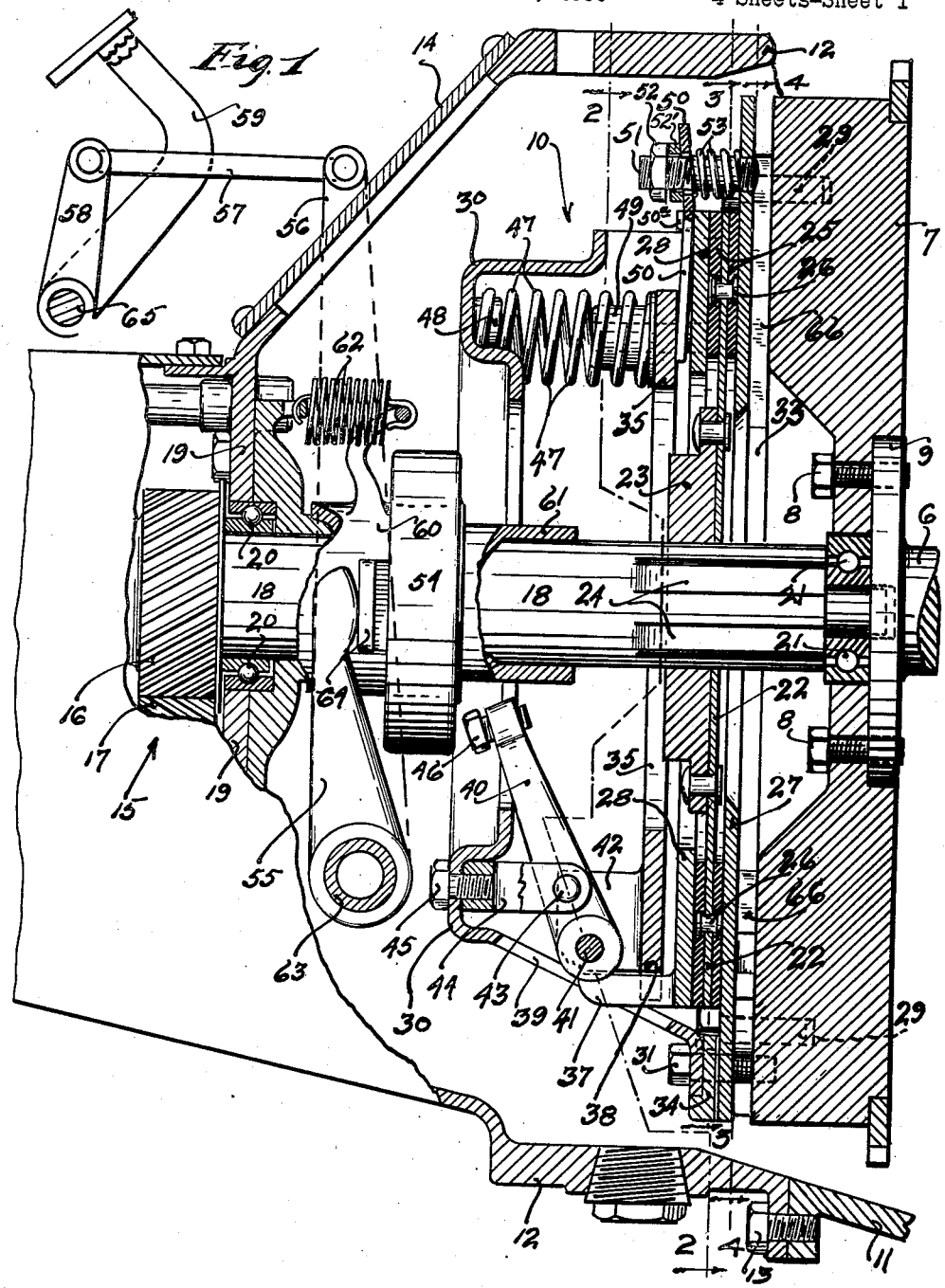
Fig. 1 is a fragmentary axial sectional view with some parts shown in full and some parts broken away.

The rear end portion of the crank shaft of an internal combustion engine, not shown, is indicated by 6. This crank shaft 6 carries a flywheel 7 which is rigidly anchored thereto by means of stud bolts 8 that are screw-threaded into an anchoring flange 9 that is formed integral with the crank shaft 6. The flywheel 7 and associated friction clutch mechanism, indicated as an entirety by 10, are contained within a suitable closure afforded by a bell housing 11 and detachably but rigidly secured to the bell housing extension 12, the latter being secured to the former by stud bolts or the like 13. The bell housing, only a small fragment of which is illustrated, may be assumed to be formed as an integral part of the cylinder block of the internal combustion engine, not shown, as in conventional automotive practice. The bell housing extension 12 is provided with the customary removable cover plate 14 to permit inspection and service of the clutch mechanism 10, and said bell housing extension 12 affords, at its rearward extremity, an enclosing and supporting casing for what may be assumed to be a conventional transmission mechanism indicated as an entirety by 15. In the drawings, however, the major portion of the conventional transmission mechanism 15 has been omitted and only two gears of the conventional transmission mechanism indicated by 16 and 17 and a transmission coupling, clutch shaft 18 has been illustrated. The clutch shaft 18, which carries the transmission gear 16, is co-axially aligned with the crank shaft 6 and is journaled at its rear end portion in a partition wall 19 of the bell housing extension 12 through the medium of a ball bearing set 20, and at its forward end the said clutch shaft 18 is journaled in the flywheel 7 through the medium of a ball bearing set 21. For the purpose of this case, it may be assumed that the several parts thus far described are conventional in character, being, in fact, roughly representative of corresponding parts of a Ford V-8 automobile.

Figure 2:
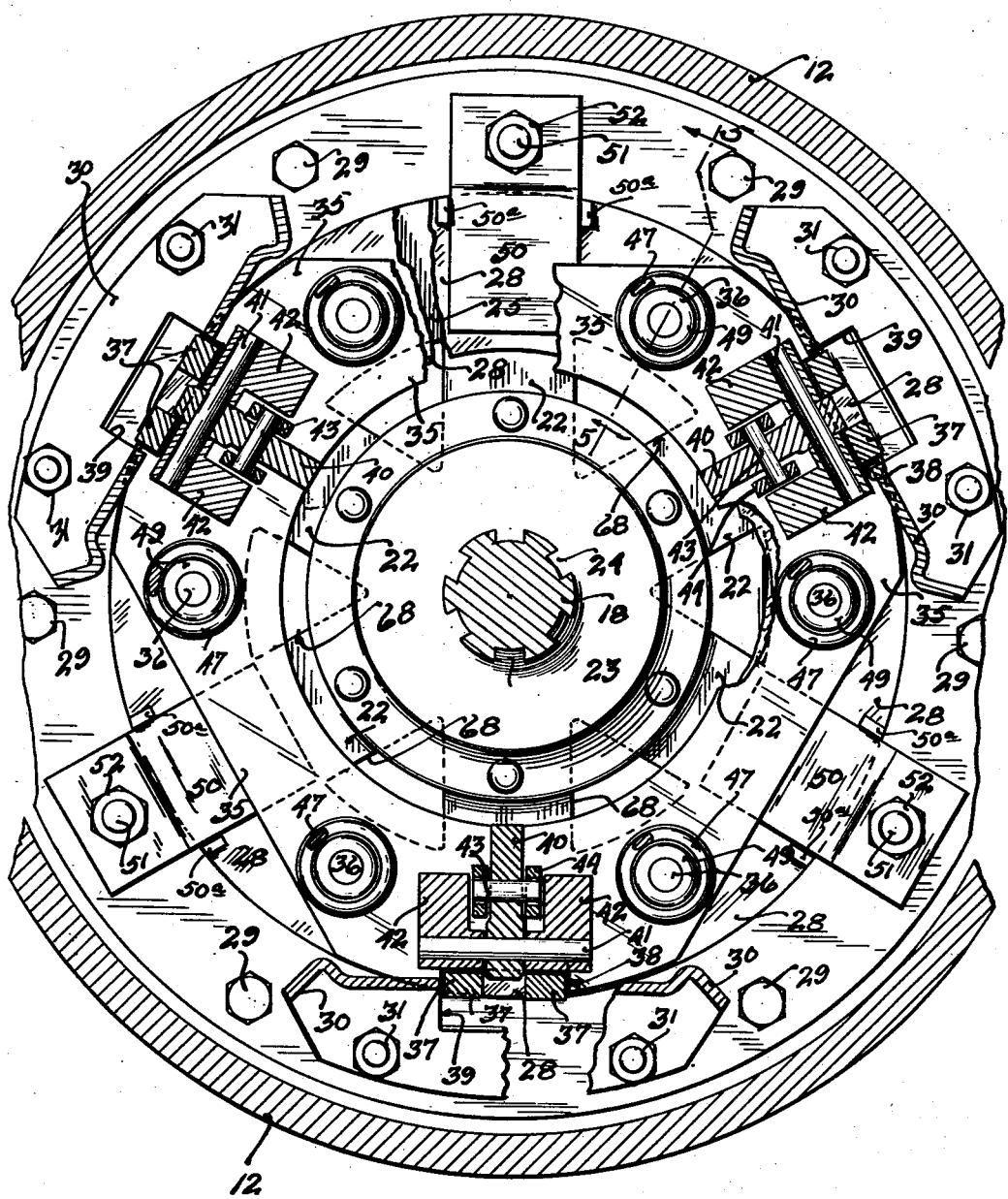
Fig. 2 is a transverse sectional view taken on the line 2—2 of Fig. 1.

My improved clutch mechanism, which provides for various degrees of coupling between the engine crank shaft 6 and the driven clutch shaft 18 includes a conventional double-faced clutch disc 22 that is mounted directly on the clutch shaft 18 through the medium of a rigidly secured hub 23. The clutch disc 22 is free for axial sliding movements on the clutch shaft 18, but as will be seen by reference particularly to Figs. 1 and 2, is maintained in positive rotary engagement with the clutch shaft 18 by interlocking spline keys and keyways 24 of the disc hub 23 and clutch shaft. The double friction facings of the clutch disc 22 are conventional in character and indicated by 25, these facings being removably secured to the disc 22 by rivets or the like 26. Cooperating with opposite facings 25 of the clutch disc 22 are axially spaced friction plates 27 and 28, which plates 27 and 28 rotate in common with the flywheel 7 and crank shaft 6, the former plate 27, being secured directly to the flywheel by means of stud bolts 29 (see full lines in Fig. 2 and dotted lines in Fig. 1), and the latter plate 28, being carried by the flywheel 7 through the medium of a clutch control housing 30 and other connections hereinafter described. The clutch control housing 30 is of the conventional character employed in Ford V-8 automobiles and is, in fact, representative of the clutch control housing of the Long clutch which is standard equipment in Ford V-8 cars. This control housing is secured to the flywheel 7 by means of stud bolts 31 that are passed through the friction plate 27 and screw-threaded into the flywheel.

Figure 3:
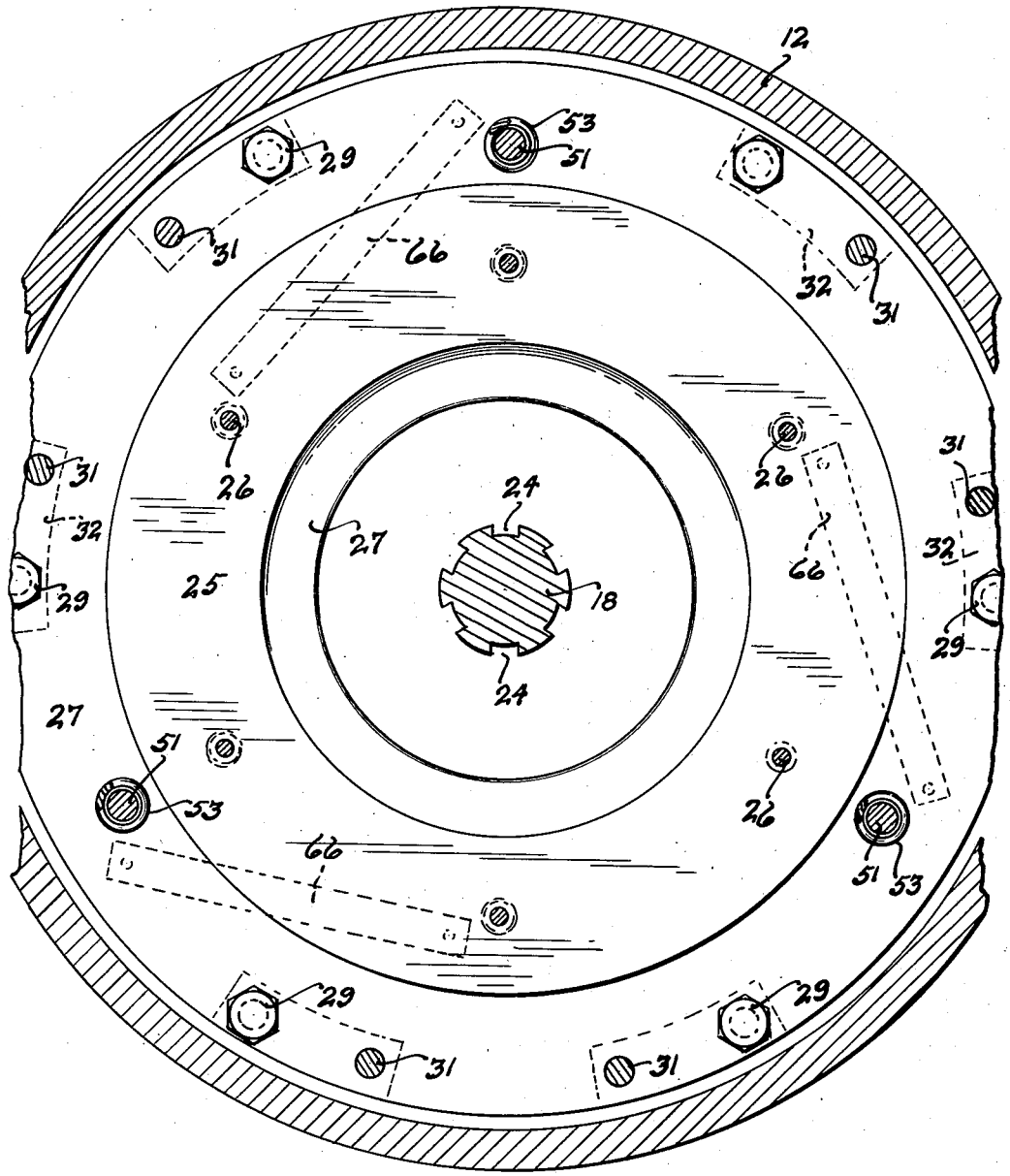
Fig. 3 is a transverse sectional view taken on the line 3—3 of Fig. 1.

It should here be noted that the friction plate 27, while secured directly to the flywheel 7, is spaced axially therefrom by means of circumferentially spaced segmental spacing lugs 32 (see Figs. 3 and 4) to provide an air circulating space or passage 33 between the flywheel 7 and plate 27, and the clutch control housing 30 is also slightly spaced from the friction plate 27 by circumferentially spaced segmental spacers 34, shown only in Fig. 1 and omitted in Fig. 3.

Figure 5:
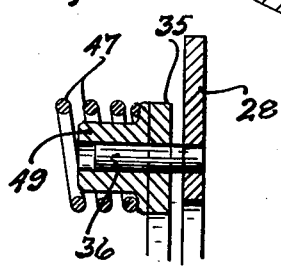
Fig. 5 is a detail fragmentary sectional view taken on the line 5—5 of Fig. 2.

The friction plate 28 is carried by an axially open pressure plate 35 for rotary movements in common therewith, but for limited axial movements in respect thereto by means of circumferentially spaced pins 36 (see Fig. 2) that are firmly press-fit into the friction plate 28 and are slip-fit into suitable apertures in the pressure plate 35, see Fig. 5. The torque load between the friction plate 28 and the pressure plate 35 is partially transmitted through the pins 36 and is partially taken through laterally spaced pairs of lugs 37 that are integrally formed with the friction plate 28 and work snugly in notches 38 in the pressure plate 35, see particularly Figs. 1 and 2. The pressure plate 35 and friction plate 28 are maintained in unitary rotary driving engagement with the flywheel, friction plate 27 and control housing 30 through engagement of the friction plate lugs 37 with the control housing, it being noted by reference to Figs. 1 and 2 that the lugs 37 work snugly through angular apertures 39 in the control housing.

The connected friction plate 28 and clutch pressure plate 35 are jointly carried by the control housing 30 for limited axial movements in respect thereto and one another through linkage which includes clutch release fingers 40 that are pivotally anchored at their outer ends at 41 between circumferentially spaced pairs of laterally spaced lugs 42, which lugs are integrally formed with the pressure plate 35 and are axially slidable in the angular recess 39. At their intermediate portions, the clutch-release fingers 40 are pivotally anchored to the control housing 30 at 43 through the medium of bifurcated anchoring lugs 44 that are rigidly but detachably secured to the control housing 30 by stud bolts 45. So that the release fingers 40 will not bind under pivotal movement, the pin-receiving apertures in the anchoring lugs 44 are elongated to permit slight shifting of the pivots 43 (see Fig. 2). At their free ends, the clutch release fingers 40, which incidentally are conventional in character and are anchored to the control housing in a conventional manner, are provided with adjustable screw-threaded studs 46.

The clutch pressure plate 35 is subject to the yielding pressure of a circumferentially spaced series of coiled compression springs 47 that are interposed between the rear wall of the control housing 30 and the pressure plate 35. At their rear extremities, the springs 47 are held against movement in respect to the control housing 30 by telescopically fitting bosses 48 that are inwardly pressed from the wall of the control housing 30 and the forward end portions of the springs 47 fit over and are held against movement in respect to the pressure plate 35 by boss-acting flanged spools 49 that are mounted for axial sliding movements with the pressure plate 35 on the projecting ends of the pins 36, see particularly Fig. 5.

The yielding pressure of the clutch-setting springs 47 is transferred from the pressure plate 35 to the clutch friction plate 28 and co-operating clutch friction disc 22 and plate 27 through the medium of pressure-multiplying levers 50, which levers 50 are adjustably pivotally anchored to the flywheel secured friction plate 27 by means of anchor bolts 51 and co-operating adjustment nuts 52, washers 52' and coiled compression springs 53. The bolts 51, see particularly Fig. 1, are screw-threaded into the flywheel secured friction plate 27 and the pressure-multiplying levers 50 work loosely over the bolts 51 for free rocking movements in the plane of the axis of the friction plates and fulcrum on the adjustable nuts 52, against which nuts 52, they are pressed by the springs 53. The multiplying levers 50, see Fig. 1, press on the rear peripheral edge of the friction plate 28 and the free end portions thereof are engaged by the pressure plate 35 and are always spaced from the friction plate 28. The leverage afforded by the multiplying levers 50 is preferably such that the pressure exerted by the springs 47 on the pressure plate 35 is several times multiplied before application to the co-operating clutch plates and disc and although the leverage may be varied materially to meet different requirements, the preferred arrangement illustrated provides for a multiplication of pressure of approximately five to one. The multiplying levers 50 work between and are maintained properly laterally posititoned by laterally spaced pairs of guide lugs 50a, which guide lugs are formed on the rear face of the clutch friction plate 28. In the preferred arrangement illustrated multiplying levers 50 are made of spring steel so that they are slightly yielding under the pressure of springs 47. This yielding action of the multiplying levers 50 results in softer and smoother clutch setting action than would be possible were the levers 50 rigid and nonyielding.

For the purpose of releasing the friction disc from frictional engagement with the friction plates 27 and 28 under the action of springs 47, conventional mechanism is employed. This conventional clutch release mechanism operates through the medium of the clutch release fingers 40 and includes linkage made up of the following noted elements, to wit: an axially movable clutch throw-out bearing 54, a clutch throw-out or release fork 55, a relatively long lever 56, a link 57, a lever 58 and a foot-pedal-equipped lever 59. The foot-pedal-equipped end of the lever 59 may be assumed to be extended within convenient reach of the operator's foot as in conventional automotive practice. The clutch throw-out bearing 54 is provided with a tubular hub 60 that is axially slidably mounted on a fixed sleeve 61, which fixed sleeve is suitably rigidly secured to the partition wall 19 of the bell housing extension 12 and works over the clutch shaft 18. The throw-out bearing 54 and its mounting hub 60 are normally held retracted so that the said bearing is out of engagement and completely free of the throw-out fingers 40 by a coiled tension spring 62. The throw-out fork 55 and lever 56 are each secured fast on a common rock shaft 63 and the free ends of the throw-out fork operatively engage the throw-out bearing 54 through lugs 64 that are formed on and project from the mounting hub 60. The lever 58 and foot-pedal-equipped lever 59 are each mounted fast on a common rock shaft 65.

Figure 4:
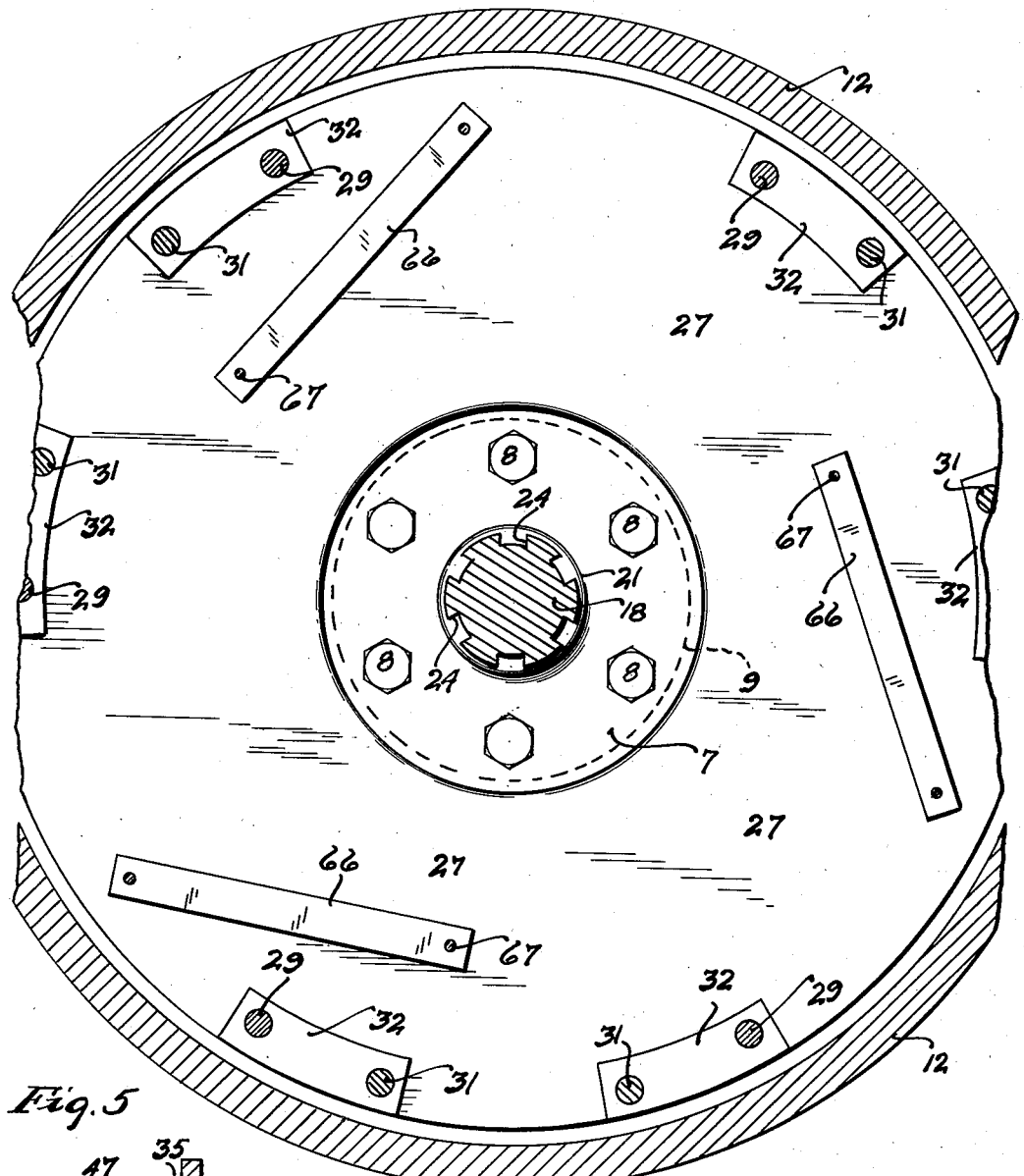
Fig. 4 is a transverse sectional view taken on the line 4—4 of Fig. 1.

For the purpose of producing a forced circulation of air through the space between the flywheel secured clutch friction plate 27 and the flywheel, to thereby carry heat repeatedly from and cool the several friction elements of the clutch, are a plurality of blower vanes 66 that are secured directly to the plate 27 by pins or the like 67, see particularly Fig. 4. These vanes 66 are longitudinally disposed in oblique relation to a radial line, and when the flywheel and rigidly anchored friction plate 27 are in motion, these vanes 66 act as the vanes of a sirocco type fan or blower and maintain a constant forced circulation of air axially through the annular pressure plate 35, the annular friction plate 28, V-shaped apertures 68 in the double-faced clutch disc 22, through the axial open portion of the annular friction plate 27, and radially outwardly through the space between the clutch plate 27 and the flywheel 7. Since it is well recognized that the greatest obstacle to long and trouble-free life of a friction clutch of this character is excessive heat, it will be readily seen that a friction clutch provided with positive ventilating means of the kind just above described, will stand much more severe use, will run much cooler and therefore will last longer than the clutches of similar character not provided with such positive ventilating means.

It will, of course, be understood that the co-operating friction elements of the clutch, which are illustrated as being subject to full multiplied pressure of the springs 47, and are therefore in non-slipping or substantially non-slipping engagement, may be wholly or partially relieved of setting pressure of the springs 47 by depression of the foot-pedal-equipped lever 59.

When the lever 59 is depressed, the clutch release bearing or collar 54 will be moved into engagement with the adjustment nuts 46 on the free ends of the clutch release fingers 40 and further movement of the throw-out bearing 54 will cause the free ends of the clutch fingers 40 to move inwardly therewith. This inward movement of the free ends of fingers 40 causes the pressure plate 35 to be moved axially rearwardly with respect to the friction plate 28 against the action of the clutch-setting springs 47 and this withdrawal of pressure plate 35 permits rearward movement of the free ends of the multiplying levers 50, which levers, under such movement, relieve the friction plate 28 of pressure and permit slippage of the double-faced clutch disc 22 with respect to the opposed friction plates 27 and 28. Obviously, when the double-faced clutch disc 22 is entirely relieved from compression between the friction plates 27 and 28, the said disc 22 will be out of driving engagement with the flywheel carried plates 27 and 28 and, therefore, it and the clutch shaft 18 will come to a stop, and under various different degrees of compression between the plates 27 and 28, the clutch disc 22 will, due to the frictional load imposed by the plates 27 and 28, be carried therewith at a variable speed dependent entirely upon the degree of frictional coupling.

If we remember that in conventional practice in Ford V-eight cars, for example, the clutch pressure springs operate directly on a pressure plate that serves also as a friction plate for co-operation with the rear facing 25 of the clutch disc 22, then it will be seen that by splitting the pressure plate to provide axially spaced friction plate 28 and pressure plate 35 and interposing between the said friction plate and pressure plate pressure multiplying means or levers as herein taught, the same effective pressure can be obtained by use of much lighter springs than are necessary to produce the same clutch pressure in conventional practice. In fact, if we assume that the levers 50 multiply the pressure of the springs five times, for example, then it will be seen that the springs 47 could be substituted with lighter springs which produce a pressure of only one-fifth that of the springs used in conventional practice, and these lighter springs, due to the levers 50, would produce the same pressure on the co-operating friction elements of the clutch assembly as did the removed heavier springs. With such revision of the clutch assembly mechanism as herein taught, the amount of pressure applied to the clutch-releasing fingers to release the co-operating clutch elements, is much less than in an equally strong clutch mechanism of conventional character, and therefore not only is the manual pressure applied through the lever 59 and associated linkage greatly reduced, but the clutch throwout bearing will also be subject to a greatly reduced pressure under clutch-releasing action. Clutch-releasing bearings are ordinarily a source of considerable trouble, but in the arrangement illustrated, the clutch throw-out bearing is subject to such greatly reduced strain that little or no trouble need be expected from this source. Otherwise stated, it may be said that the clutch-setting pressure of the springs 47 can be greatly multiplied by means of the levers without increasing the pressure necessary to overcome the same to release the clutch, and by the same token, through a combination of lighter than conventional springs and the use of the pressure-multiplying levers, the same degree of clutch-setting pressure can be obtained with a great reduction in pressure necessary to release the clutch.

What I claim is:

1. In a friction clutch mechanism, the combination of a rotatively mounted axially fixed friction element, a clutch control housing mounted on the said axially fixed friction element, a pressure plate mounted within the said housing in axially spaced relation to the said axially fixed friction element, lever means anchoring the said pressure plate to the clutch control housing for axial adjusting movements, yielding means interposed between the control housing and pressure plate and maintaining the latter under yielding pressure to move axially toward the said axially fixed friction element, an axially movable friction element carried by said pressure plate in axially spaced opposed relation to said axially fixed friction element and for axial adjusting movements in respect to the said pressure plate, a friction disc interposed between the said axially fixed and axially movable friction elements for rotary movements in respect thereto, and a circumferentially spaced plurality of pressure multiplying levers operatively connecting the said pressure plate to the said axially movable friction element.

2. In a friction clutch mechanism, the combination of a rotatively mounted axially fixed friction element, a clutch control housing mounted on the said axially fixed friction element, a pressure plate mounted within the said housing in axially spaced relation to the said axially fixed friction element, lever means anchoring the said pressure plate to the clutch control housing for axial adjusting movements, yielding means interposed between the control housing and pressure plate and maintaining the latter under yielding pressure to move axially toward the said axially fixed friction element, an axially movable friction element carried by said pressure plate in axially spaced opposed relation to said axially fixed friction element and for axial adjusting movements in respect to the said pressure plate, a friction disc interposed between the said axially fixed and axially movable friction elements for rotary movements in respect thereto, and a circumferentially spaced plurality of pressure multiplying levers operatively connecting the said pressure plate to the said axially movable friction element, said levers each being pivotally anchored at one end with respect to the axially fixed friction element, engaging the pressure plate at its other end and engaging the axially movable friction element at its intermediate portion.

3. The combination with a drive shaft and an axially aligned shaft to be driven therefrom, of a friction clutch mechanism providing variable degree coupling between said shafts, said clutch mechanism comprising an axially fixed friction element mounted fast on the said drive shaft, an axially movable friction clutch element mounted in axially spaced relation to and for common rotary movements with the said axially fixed friction element, an axially movable friction disc interposed between said axially fixed and axially movable friction elements, driving connections between the said clutch disc and the said driven shaft, an axially movable pressure plate axially spaced from the axially movable friction element, pressure multiplying means interposed between the pressure plate and the axially movable friction element, yielding means maintaining said pressure plate under pressure to move toward the said friction elements, means for retracting the pressure plate against the action of said yielding means, said means for retracting the pressure plate including lever-acting release fingers anchored for rotary movements with the pressure plate, an axially movable throwout bearing engageable with said release fingers, and means for axially shifting said throw-out bearing.

4. The combination of a drive shaft, a driven shaft, a friction clutch interposed between said shafts to provide variable degree coupling therebetween, said friction clutch comprising co-operating driving and driven friction elements mounted for common driving movements with the driving and driven shafts respectively, an axially movable pressure plate axially spaced from the said co-operating friction elements, pressure multiplying means interposed between and operatively connecting the pressure plate and the said co-operating friction elements, yielding means maintaining said pressure plate under tension to move toward the said friction elements, and means for retracting the pressure plate against yielding action of said yielding means, said means including a plurality of lever-acting release fingers anchored for rotary movements with the said pressure plate.

5. In a friction clutch mechanism, the combination of an axially spaced pair of friction clutch elements mounted for common rotary movements and for axial adjusting movements in respect to one another, at least one co-operating friction element mounted between said pair of axially spaced friction elements for rotary movements in respect thereto, a clutch control housing mounted for rotary movements with one of said friction clutch elements, a pressure plate within said housing axially intermediate one end portion thereof and one of said pair of friction elements, means for mounting the said pressure plate for common rotary movements with, but for axial movements in respect to said pair of friction clutch elements, yielding means reacting against said control housing and maintaining the pressure plate under pressure to move toward the said friction clutch elements, lever means operatively connecting the pressure plate to the clutch control housing for axial retracting movements against the yielding action of said yielding means, and a circumferentially spaced plurality of pressure multiplying levers operatively connecting the said pressure plate to the adjacent one of said axially movable pair of friction clutch elements.

6. The combination of a drive shaft, a driven shaft, a variable slippage clutch interposed between said shafts to provide a variable degree coupling therebetween, said slippage clutch comprising co-operating driving and driven friction elements mounted for common rotary movements with the driving and driven shafts, respectively, a clutch control housing carried by one of said shafts and enclosing the said clutch, an axially movable pressure plate axially spaced from the said co-operating friction elements, pressure multiplying means interposed between and connecting the pressure plate and the said co-operating friction elements, yielding means maintaining the pressure plate under pressure to move toward said friction elements, and means for retracting the pressure plate against the action of said yielding means, said releasing means including a plurality of lever-acting release fingers anchored for common rotary movements with the pressure plate and clutch control housing.

7. The combination with a driving shaft and an axially aligned shaft to be driven therefrom, of a friction clutch mechanism providing variable degree coupling between said shafts, said clutch mechanism comprising an axially fixed friction element mounted fast on one of said shafts, an axially movable friction clutch element mounted in axially spaced relation to and for common rotary movements with said axially fixed friction element, an axially movable friction disc interposed between said axially fixed and axially movable elements, driving connections between said clutch disc and the other of said shafts, an axially movable pressure plate spaced axially from the axially movable friction element, pressure multiplying levers pivotally anchored to the axially fixed of said friction clutch elements radially outward of said axially movable friction element and friction disc and operatively engaging said pressure plate at their free end portions and the said axially movable friction element at their intermediate portions, yielding means maintaining said pressure plate under pressure to move toward said friction elements, and means for retracting the pressure plate against the action of said yielding means.

ALBERT BARNES BEAR.